E. A. CORDEIRO da SILVA.

Animal-Traps.

No. 135,732.            Patented Feb. 11, 1873.

Witnesses:          Inventor:

UNITED STATES PATENT OFFICE.

EMILE ACHILLES CORDEIRO DA SILVA, OF NEW YORK, N. Y.

IMPROVEMENT IN ANIMAL-TRAPS.

Specification forming part of Letters Patent No. 135,732, dated February 11, 1873.

*To all whom it may concern:*

Be it known that I, EMILE A. CORDEIRO DA SILVA, of the city, county, and State of New York, have invented a new and useful Improvement in Animal-Traps, of which the following is a specification:

The object of this invention is not only to provide an efficient trap for catching rats and other animals, but to make a trap which shall be self-setting, and consequently always ready; and it consists in a box, of oblong or other form, a portion of the top of which is pivoted to the sides, and nearly balanced on its pivots, with an inclosure or bait-chamber above said top, and with one or more inclines by means of which the animal is enabled to reach the top of the trap, the construction and arrangement of parts being hereinafter more fully described.

Figure 1:
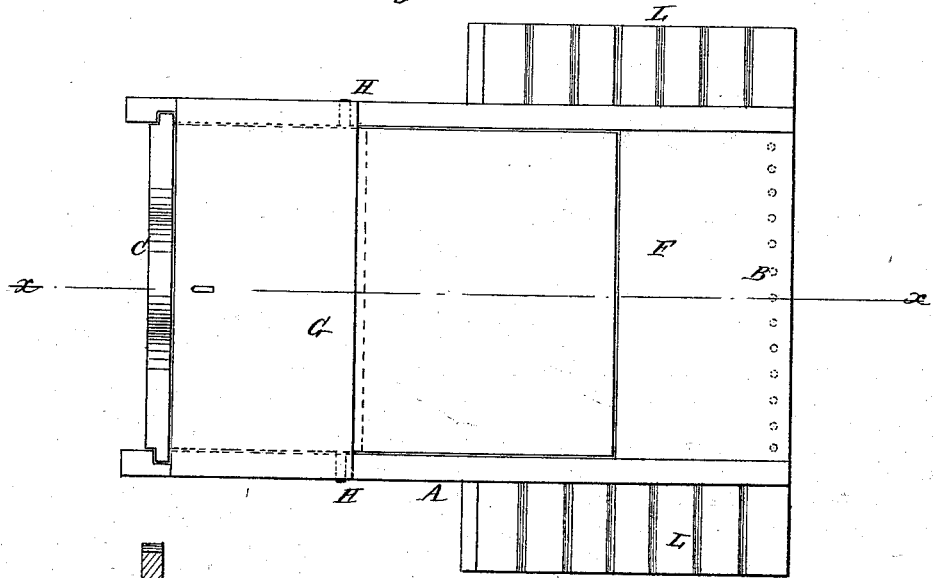
Figure 2:
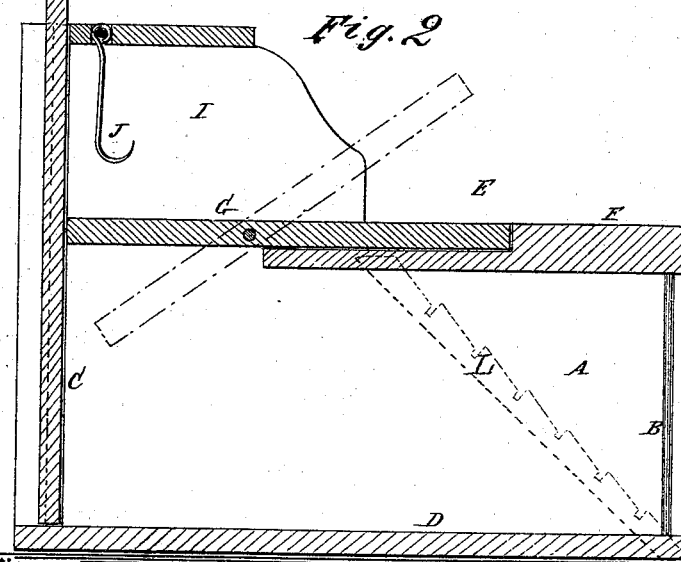

In the accompanying drawing, Figure 1 represents a top view of the trap. Fig. 2 is a vertical section of Fig. 1 taken on the line $x\ x$.

Similar letters of reference indicate corresponding parts.

A is the box, of rectangular or other form, with wire grating B at one end, and with a vertical slide, C, at the other end. D is the bottom of the trap. E is the top, which is made in two parts, one part, F, being stationary, and the other part, G, being hung on pivots H, so that it is nearly balanced. The part F is cut away or rabbeted, so that when the trap is set, as seen, the top of the trap presents a smooth and even surface. I is the bait-chamber arranged on top of the trap, and directly over the pivoted portion G. J is the hook to which the bait is secured. L L are inclined pieces of board on the sides of the trap, sawed or notched, as seen in the drawing, by means of which the animal reaches the top of the trap.

To reach the bait he unsuspectingly goes onto the pivoted portion G, which tips up the moment he passes the pivots, and lands him in the trap beneath, where he is secure, while the part G returns by its own gravity to its original position, thus resetting itself.

This trap is very simple in its construction, and very efficient in its operation. It may be made of any size required to adapt it to different animals, and will be found especially valuable in clearing the premises of rats and mice.

Having thus described my invention, I claim as new and desire to secure by Letters Patent—

The wire grating B, vertical slide C, bottom D, two-part top E F, bait-chamber I, hook J, and inclines L L, all combined, constructed, and arranged, in connection with box A, as and for the purpose described.

E. A. C. DA SILVA.

Witnesses:
T. B. MOSHER,
ALEX. F. ROBERTS.